US009542197B2

United States Patent
Ali et al.

(10) Patent No.: US 9,542,197 B2
(45) Date of Patent: Jan. 10, 2017

(54) ROUTER AND A VIRTUAL TRUSTED RUNTIME BIOS

(75) Inventors: Valiuddin Y Ali, Cypress, TX (US); Jose Paulo Xavier Pires, Porto Alegre (BR); James M Mann, Cypress, TX (US); Boris Balacheff, Lyons (FR); Chris I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 14/347,086

(22) PCT Filed: Oct. 19, 2011

(86) PCT No.: PCT/US2011/056932
§ 371 (c)(1),
(2), (4) Date: May 9, 2014

(87) PCT Pub. No.: WO2013/032508
PCT Pub. Date: Mar. 7, 2013

(65) Prior Publication Data
US 2014/0250294 A1 Sep. 4, 2014

Related U.S. Application Data

(63) Continuation of application No. PCT/US2011/054045, filed on Sep. 29, 2011, which is
(Continued)

(51) Int. Cl.
*G06F 9/44* (2006.01)
*G06F 9/455* (2006.01)
*G06F 21/57* (2013.01)

(52) U.S. Cl.
CPC ......... *G06F 9/4401* (2013.01); *G06F 9/45541* (2013.01); *G06F 9/45558* (2013.01);
(Continued)

(58) Field of Classification Search
CPC ...... G06F 21/57; G06F 21/572; G06F 21/575; G06F 9/4401; G06F 9/4558
See application file for complete search history.

(56) References Cited

U.S. PATENT DOCUMENTS 5,574,920 A     11/1996  Parry
5,701,477 A  *  12/1997  Chejlava, Jr. ......... G06F 9/4406
                                                            713/2
(Continued)

FOREIGN PATENT DOCUMENTS

JP    2005-143120    6/2005
JP    2005-529401    9/2005
(Continued)

OTHER PUBLICATIONS

Extended European Search Report, EP Application No. 11871598.6, Date: May 8, 2015, pp. 1-6.
(Continued)

*Primary Examiner* — Jung Kim
*Assistant Examiner* — Carlos M De Jesus Lassala
(74) *Attorney, Agent, or Firm* — HP Patent Department (57) ABSTRACT

An implementation may include a virtual trusted runtime BIOS managed by the virtual machine monitor. A replacement portion of the virtual trusted runtime BIOS may be included. A router can replace an address to a resource of the virtual trusted runtime BIOS with the address to the resource of the replacement portion of the virtual trusted runtime BIOS.

20 Claims, 4 Drawing Sheets

Related U.S. Application Data a continuation of application No. PCT/US2011/049677, filed on Aug. 30, 2011.

(52) U.S. Cl.
CPC ............ *G06F 21/57* (2013.01); *G06F 21/572* (2013.01); *G06F 21/575* (2013.01); *G06F 2009/45587* (2013.01)

(56) References Cited

U.S. PATENT DOCUMENTS

| | | | |
|---|---|---|---|
| 5,844,986 A | * | 12/1998 | Davis .................... G06F 21/572 |
| | | | 713/187 |
| 7,676,666 B2 | | 3/2010 | Lambert et al. |
| 8,429,276 B1 | | 4/2013 | Kumar et al. |
| 8,977,842 B1 | | 3/2015 | McCorkendale et al. |
| 2004/0193865 A1 | | 9/2004 | Nguyen et al. |
| 2007/0055968 A1 | | 3/2007 | Rader |
| 2008/0082976 A1 | * | 4/2008 | Steinwagner ............ G06F 8/63 |
| | | | 718/1 |
| 2008/0215770 A1 | | 9/2008 | Liu et al. |
| 2009/0198988 A1 | * | 8/2009 | Bai ....................... G06F 9/455 |
| | | | 713/2 |
| 2010/0064127 A1 | | 3/2010 | Lee et al. |
| 2010/0174924 A1 | | 7/2010 | Banga et al. |
| 2010/0199062 A1 | | 8/2010 | Sancho-Dominguez |
| 2010/0332912 A1 | * | 12/2010 | Eide ...................... G06F 11/328 |
| | | | 714/46 |
| 2011/0061045 A1 | | 3/2011 | Phillips |
| 2011/0072254 A1 | * | 3/2011 | Kuang .................. G06F 9/4403 |
| | | | 713/2 |
| 2011/0145821 A1 | | 6/2011 | Philipson et al. |
| 2012/0054744 A1 | * | 3/2012 | Singh ...................... G06F 21/53 |
| | | | 718/1 |

FOREIGN PATENT DOCUMENTS

| | | |
|---|---|---|
| JP | 2006-252554 | 9/2006 |
| JP | 2007-213465 | 8/2007 |
| JP | 2008-523511 | 7/2008 |
| JP | 2009-508183 | 2/2009 |
| JP | 2009-176213 | 8/2009 |
| JP | 2009-230433 | 10/2009 |
| JP | 2011-076505 | 4/2011 |
| JP | 2011-145776 | 7/2011 |

OTHER PUBLICATIONS

International Search Report and Written Opinion received in PCT Application No. PCT/US2011/056932, mailed Sep. 17, 2012, 8 pages.

Steinberg et al; "Nova: a Microhypervisor-based Secure Virtualization Architecture", http://os.inf.tu-dresden.de/papers_ps/steinberg_eurosys2010.pdf, 2010.

US Non-Final Office Action cited in U.S. Appl. No. 14/238,729 dated Mar. 24, 2015; 16 pages.

\* cited by examiner

ROUTER AND A VIRTUAL TRUSTED RUNTIME BIOS

CROSS-REFERENCE TO RELATED APPLICATION

This application is a national stage application under 35 U.S.C §371 of PCT/US2011/056932, filed Oct. 19, 2011, which is a continuation of PCT/US2011/054045, filed Sep. 29, 2011, and which is a continuation of PCT/US2011/049677, filed Aug. 30, 2011.

BACKGROUND

An electronic device, such as a computer or other type of device, can include a Basic Input/Output System (BIOS) that is responsible for starting up the electronic device. During startup, the BIOS initializes and configures components of the electronic device, and loads an operating system in the electronic device. In addition, the BIOS can also provide other services, such as a power management service, a thermal management service, a BIOS update service, and so forth.

BRIEF DESCRIPTION OF THE DRAWINGS

Some embodiments are described with respect to the following figures.

DETAILED DESCRIPTION

A Basic Input/Output System (BIOS) is usually the first code executed by an electronic device when the electronic device starts. Examples of the electronic device include a computer (e.g. desktop computer, notebook computer, tablet computer, server computer, etc.), a handheld device (e.g. personal digital assistant, smart phone, etc.), an electronic appliance, a gaming console, or any other type of electronic device. The BIOS initializes and configures various hardware components of the electronic device, and loads and starts an operating system (OS) of the electronic device. Code for the BIOS is usually stored on a non-volatile memory, such as a flash memory device or other type of programmable read-only memory (ROM).

Although various example BIOS functions are listed above, it is noted that other or alternative BIOS functions can be used in other implementations.

In accordance with some implementations, for more robust system behavior, functions of the BIOS can be provided in a virtual trusted runtime BIOS of the electronic device which may be in the privileged domain, where the privileged domain is a domain of the electronic device that has certain predefined privilege(s) not available to other entities in the electronic device. A "privileged domain" may refer to a domain that has predefined privilege(s) that allows an entity in the domain to perform functions in the electronic device that other entities (e.g. OS, application programs, etc.) are not allowed to perform. Also, a privileged domain also has a security mechanism to protect the privileged domain from unauthorized access or attack.

Communication with the virtual trusted runtime BIOS may be by a web based protocol. A physical BIOS cannot be replaced in real time because an operating system would not be able to continue operating without a BIOS while it was replaced. A virtual trusted runtime BIOS can be replaced at least in part by appropriately authorized replacement of a portion of the virtual runtime BIOS, and redirecting communications via the web based protocol to the replacement portion of the virtual trusted runtime BIOS.

Examples of a privileged domain include any or some combination of the following: domain 0, which is often the first domain started by a virtual machine monitor (also referred to as a hypervisor) to perform management tasks; a portion of the virtual machine monitor (or hypervisor); a guest virtual machine that has predefined settings to provide the guest virtual machine with enhanced privileges and/or security; or another type of domain in the electronic device with a predefined special privilege and/or security mechanism. The secure privileged domain can include the virtual trusted runtime BIOS which can include a virtual high-privilege mode for handling system management instructions securely without having to have a component on a peer level with the virtual machine monitor such as an system management mode transfer monitor to separate and secure a virtual high-privilege mode from the other domains.

A "virtual machine" (also referred to as a "virtual appliance" or "virtual partition") refers to some partition or segment of a physical machine (the electronic device) that is provided to virtualize or emulate a physical machine. From the prospective of a user or application, a virtual machine looks like a physical machine. A virtual machine includes an operating system (referred to as a guest operating system) and at least one application program.

A virtual machine monitor (VMM), also referred to as a hypervisor, manages the sharing, by the virtual machines, of the physical resources, including the hardware components, of the electronic device. The VMM virtualizes the physical resources. Each virtual machine has an associated virtualized physical resources managed by the VMM. The VMM processes requests for physical resources.

In one implementation, a computing system includes hardware and a virtual machine monitor. The virtual machine monitor can managed a virtual trusted runtime BIOS. The computing system can include a replacement portion of the virtual trusted runtime BIOS. A router can replace an address to a resource of the virtual trusted runtime BIOS with the address to the resource of the replacement portion of the virtual trusted runtime BIOS.

In another implementation, a method of replacing a portion of a virtual trusted runtime BIOS in a computing system includes a virtual trusted runtime BIOS that is managed by the virtual machine monitor and a replacement portion of the virtual trusted runtime BIOS managed by the virtual machine monitor. A router can replace a first address to a resource of the virtual trusted runtime BIOS with a second address to the resource of the replacement portion of the virtual trusted runtime BIOS.

Figure 1:
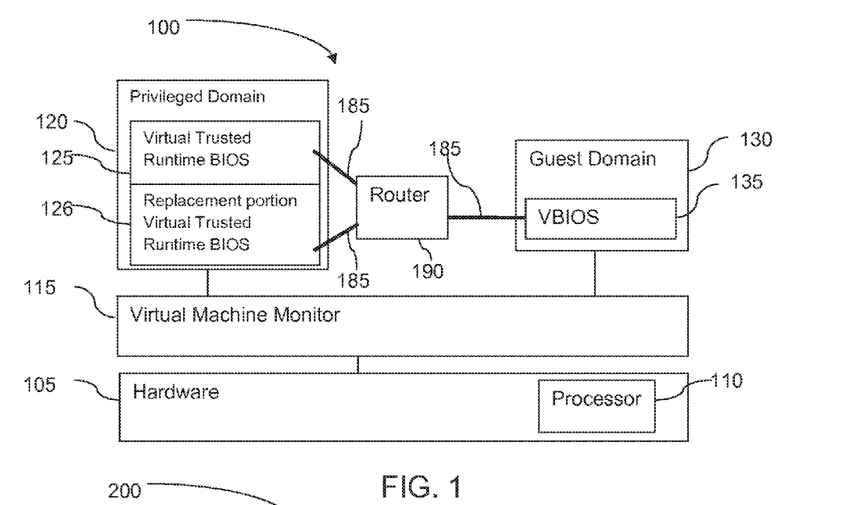
FIG. 1 is a block diagram of a computing system according to an example implementation of replacing a portion of a virtual trusted runtime BIOS.

With reference to the figures. FIG. 1 is a block diagram of a computing system according to an example implementation of replacing a portion of a virtual trusted runtime BIOS. A computing system 100 can include a processor 110. The processor 110 is part of the hardware 105 of the computing system 100. The processor 110 can be a general purpose processor or an application specific processor. As examples, the hardware 105 can also include: I/O devices, volatile memory, secondary storage, flash memory, a network interface controller, a graphics adapter, and so forth. The system can include a virtual machine monitor 115 to manage the physical resources of the hardware components and virtualize the physical resources. The computing system includes a virtual basic input output system (vBIOS) 135 attached to a guest domain 130. The guest domain 130 is a virtual machine which may execute an operating system such as Microsoft Windows, Linux, Unix, or another operating system.

In some examples, the privileged domain 120 is domain 0, which is an administrative domain started by the VMM 102 upon system startup, and which has enhanced privileges and security mechanisms. Examples of tasks performed by domain 0 include creating and configuring guest domains. Each of domain 0 and guest domains is considered a corresponding virtual machine. The privileged domain 120 can be separate from the VMM 115. In alternative implementations, the privileged domain 120 can be part of the VMM 115. In such alternative implementations, the virtual trusted runtime BIOS function 125 is part of the VMM 115. The privileged domain 120 can be a trusted domain as it is generated or managed by the trusted VMM 115.

The provision of the BIOS function 125 in the privileged domain 120 implements a "BIOS in a cloud," also referred to as "virtual trusted runtime BIOS 125" or BIOS.v. The "cloud" can refer to the privileged domain 120 (or some other trusted domain). The cloud can be located either in the computing system 100 or external of the computing system 100. For example, the cloud containing a virtual trusted runtime BIOS 125 function can be accessible by the computing system 100 over a network. The network may be for example a local, wide or worldwide network.

In some implementations, the web-based interface provided by a web-based network communication function is part of a service requestor-service provider model that allows the requestor (e.g. a domain) to request a service (e.g. BIOS service) from a provider (e.g. server computer) over a network. As examples, the web-based interface can be a web services interface. A web service refers to a mechanism designed to support interoperable machine-to-machine which may be virtual machine to virtual machine interaction over a network. The web services interface can be according to a format described by a Web Services Description Language (WSDL), as defined by the World Wide Web Consortium (W3C). Alternatively, the web services interface can be according to a Simple Object Access Protocol (SOAP) (also defined by the W3C), which is a protocol for exchanging structured information in the implementation of web services over networks.

As yet another alternative, the web-based interface can be according to a Representational State Transfer (REST) architecture, which includes clients and servers, where clients can submit requests to servers, and servers can provide responses to clients. Requests and responses are built around the transfer of representations of resources. A resource can be any coherent and meaningful concept that may be addressed. A representation of a resource is typically a document that captures the current or intended state of a resource. In the REST architecture, a request submitted by a client (e.g. the electronic device) can be a Hypertext Transfer Protocol (HTTP) Get request, in some examples. The server (e.g. server computer) can provide an HTTP response to the HTTP Get request.

In the web-based interface, a resource (e.g. the internal BIOS function or external BIOS function) can be accessed by issuing a BIOS access request that contains an address of the requested resource. The address can be a web address, such as a Uniform Resource Locator (URL), an Internet Protocol (IP) address, Simple Mail Transfer Protocol (SMTP) such as an email address or some other address that can uniquely identify the requested resource.

To update a virtual trusted runtime BIOS 125 a replacement portion of the virtual trusted runtime BIOS 126 is generated. The replacement portion of the virtual trusted runtime BIOS 126 may be at a different address than the virtual trusted runtime BIOS 125. For example the virtual trusted runtime BIOS may have a requested resource at a first URL, IP address, or SMTP address and the replacement portion of the virtual trusted runtime BIOS may have the replacement requested resource at a second URL, IP address or SMTP address. The replacement portion of the virtual trusted runtime BIOS 126 may be located at in the domain of the virtual trusted runtime BIOS 125 such as the privileged domain 120 or a different location including another domain and a location remote from the computing system.

A router 190 can replace an address to a resource of the virtual trusted runtime BIOS with the address to the resource of the replacement portion of the virtual trusted runtime BIOS. The router 190 may be a physical component such as processor 110, may be a virtual component, may be a part of the VMM or may be another component.

The replacement portion of the virtual trusted runtime BIOS may be received from an external source such as a computing system manufacturer. The replacement portion of the virtual trusted runtime BIOS may be a setting, for example a fan control setting or algorithm to control the temperature of the system. Updating the virtual trusted runtime BIOS in real time settings may prevent rebooting a computing system to update the BIOS or any portion of the BIOS. For example if the fan control setting were updated using the virtual trusted runtime BIOS and a replacement portion of the virtual trusted runtime BIOS. The replacement portion of the virtual trusted runtime BIOS may include a replacement requested resource such as the fan control settings. To access the replacement requested resource a system may use the URL, IP address or SMTP address of the replacement portion of the virtual trusted runtime BIOS including the replacement requested resource.

To redirect a request for a resource, a component such as a VMM, may replace the URL, IP address or SMTP address of a communication. For example the VMM may include a table of addresses of the virtual trusted runtime BIOS and a corresponding address of the replacement portion of a virtual trusted runtime BIOS. If a request for a resource is send to an address of the virtual trusted runtime BIOS a component, such as the VMM, may redirect the request to an address of the virtual trusted runtime BIOS to an address of the replacement portion of the virtual trusted runtime BIOS.

In an alternative implementation a component may notify a domain that may request a resource, such as a guest domain, of a new address for a resource if a replacement portion of a virtual trusted runtime BIOS includes the replacement resource. Notifying the domain of the change of the address of a resource can redirect the request for the resource.

In response to the virtual trusted runtime BIOS access request containing the address that is received at the web-based interface, the web-based network communication function can direct the request to an appropriate one of the internal and external virtual trusted runtime BIOS functions. In some cases, the web-based network communication function can direct the request to both the internal and external virtual trusted runtime BIOS functions.

Figure 2:
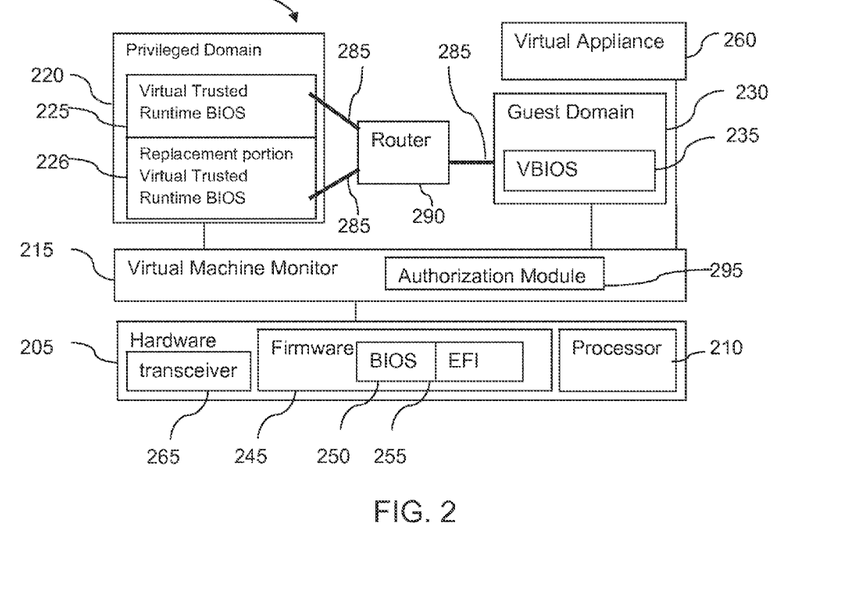
FIG. 2 is a block diagram of a computing system according to an example implementation of replacing a portion of a virtual trusted runtime BIOS.

FIG. 2 is a block diagram of a computing system according to an example implementation of a virtual high-privilege mode. A computing system 200 can include a processor 210. The processor 210 is part of the hardware 205 of the computing system 200. The hardware can include firmware 245 which may include the basic input/output system (BIOS) 250 and the extensible firmware interface (EFI) 255. The BIOS 250 may be referred to as a physical BIOS. A "physical BIOS" refers to BIOS code that resides in non-volatile memory such as flash memory or other programmable read/only memory, and which is to be executed upon startup of the computing system 200. In some implementation the physical BIOS may be a reduced (simplified) version of the BIOS since at least part of the system management mode is moved to the virtual trusted runtime BIOS 225. If a virtual trusted runtime BIOS 225 is implemented the physical BIOS 250 may remain unlocked to allow changes because of the trust attached to the virtual trusted runtime BIOS 225. The processor 210 can be a general purpose processor or an application specific processor. The system can include a virtual machine monitor VMM 215 to manage the physical resources of the hardware components and virtualize the physical resources. The computing system 200 includes a virtual basic input output system (vBIOS) 235 attached to a guest domain 230. The guest domain 230 is a virtual machine which may execute an operating system such as Microsoft Windows, Linux, Unix, or another operating system.

In some examples, the privileged domain 220 is domain 0, an administrative domain started by the VMM 215 upon system startup, which has enhanced privileges and security mechanisms. Examples of tasks performed by domain 0 include creating and configuring guest domains. Each of domain 0 and guest domains is considered a corresponding virtual machine. The privileged domain 220 can be separate from the VMM 215. In alternative implementations, the privileged domain 220 can be part of the VMM 215. In such alternative implementations, the virtual trusted runtime BIOS 225 is part of the VMM 215.

In some implementations, BIOS in a cloud is based on the following VMM-based architecture: the physical BIOS knows and trusts the main runtime entity (VMM 215) that the physical BIOS is booting, and the BIOS-trusted VMM has the ability to trap and turn off all I/O requests (to access BIOS functionality) other than those coming from the privileged domain. In some implementations, a BIOS verification mechanism can be provided to authenticate the origin of the VMM that is to be booted by the computing system. Such verification mechanisms allow an administrator or other user to specify that only an authorized VMM can be booted in the computing system. The verification mechanism assures that the VMM image that is in the computing system has not been modified maliciously, and that the VMM can be trusted. The physical BIOS can visually verify the VMM image, and ensure that the VMM is booted with a known set of controlled operational settings that have previously been specified.

After verifying that an authorized VMM has been booted, the physical BIOS can then defer or omit execution of various security measures that the physical BIOS would normally perform to prevent corruption by unauthorized or malicious code. For example, the physical BIOS can choose to not lock BIOS flash registers and/or portions of flash memory.

In implementations in which the virtual trusted runtime BIOS 225 is provided internally in a computing system 200. From the perspective of a guest virtual machine or other entity of the computing system that wants to access BIOS services, the cloud including the BIOS services can be located anywhere, including in a location that is external of the computing system.

In one implementation with a virtual trusted runtime BIOS, no other domain than privileged domain or another trusted domain will be able to communicate with BIOS. This can be because all communication from a guest domain to the BIOS are trapped and routed to the privileged domain portion for the appropriate filter to receive and process. The virtual high-privilege mode in the privilege domain can then process the request and can make direct or indirect calls to the flash or the BIOS. This call from the privileged domain to the BIOS which will then be allowed by the hypervisor to go through since Hypervisor can detect a call originating from the privileged domain rather than a guest domain.

To update a virtual trusted runtime BIOS 225 a replacement portion of the virtual trusted runtime BIOS 226 is generated. The replacement portion of the virtual trusted runtime BIOS 226 may be at a different address than the virtual trusted runtime BIOS 225. For example the virtual trusted runtime BIOS may have a requested resource at a first URL, IP address, or SMTP address and the replacement portion of the virtual trusted runtime BIOS may have the replacement requested resource at a second URL, IP address or SMTP address. The replacement portion of the virtual trusted runtime BIOS 126 may be located at in the domain of the virtual trusted runtime BIOS 225 such as the privileged domain 220 or a different location including another domain and a location remote from the computing system.

A router 290 can replace an address to a resource of the virtual trusted runtime BIOS with the address to the resource of the replacement portion of the virtual trusted runtime BIOS. The router 290 may be a physical component such as processor 210, may be a virtual component, may be a part of the VMM or may be another component.

The replacement portion of the virtual trusted runtime BIOS may be received from an external source such as a computing system manufacturer. The replacement portion of the virtual trusted runtime BIOS may be a setting, for example a fan control setting or algorithm to control the temperature of the system. Updating the virtual trusted runtime BIOS in real time settings may prevent rebooting a computing system to update the BIOS or any portion of the BIOS. For example if the fan control setting were updated using the virtual trusted runtime BIOS and a replacement portion of the virtual trusted runtime BIOS. The replacement portion of the virtual trusted runtime BIOS may include a replacement requested resource such as the fan control settings. To access the replacement requested resource a system may use the URL, IP address or SMTP address of the replacement portion of the virtual trusted runtime BIOS including the replacement requested resource.

To redirect a request for a resource, a component such as a VMM, may replace the URL, IP address or SMTP address of a communication. For example the VMM may include a table of addresses of the virtual trusted runtime BIOS and a corresponding address of the replacement portion of a virtual trusted runtime BIOS. If a request for a resource is send to an address of the virtual trusted runtime BIOS a component, such as the VMM, may redirect the request to an address of the virtual trusted runtime BIOS to an address of the replacement portion of the virtual trusted runtime BIOS.

In an alternative implementation a component may notify a domain that may request a resource, such as a guest domain, of a new address for a resource if a replacement portion of a virtual trusted runtime BIOS includes the replacement resource. Notifying the domain of the change of the address of a resource can redirect the request for the resource.

In response to the virtual trusted runtime BIOS access request containing the address that is received at the web-based interface, the web-based network communication function can direct the request to an appropriate one of the internal and external virtual trusted runtime BIOS functions. In some cases, the web-based network communication function can direct the request to both the internal and external virtual trusted runtime BIOS functions.

The replacement of a portion of the virtual trusted runtime BIOS should be secure to prevent the system from becoming vulnerable to attack due to the replacement of the portion of the virtual trusted runtime BIOS. An authorization module 295 which is shown in the VMM 215 but may be located in a domain or a virtual appliance for example may authorize the replacement of the virtual trusted runtime BIOS. The authorization module may authorize the generation of the replacement portion of the virtual trusted runtime BIOS 226 at which time the router can route a request to an address of the replacement portion of the virtual trusted runtime BIOS. The authorization module 295 may authorize the router to replace the address of a resource of the virtual trusted runtime BIOS with the replacement portion of the virtual trusted runtime BIOS. The authorization module may read a digital signature, digital certificate, or another component of the replacement portion of the virtual trusted runtime BIOS. The VMM 215 is a trusted component and the authorization module may rely on the trust component of the VMM 215 to authorize the routing of a request to the address of the replacement portion of the virtual trusted runtime BIOS.

The communication 285 can be routed to a first address of a resource of the virtual trusted runtime BIOS 225 or a second address of a replacement portion of the virtual trusted runtime BIOS 226. Although only one replacement portion is shown it may represent multiple replacement portions of the virtual trusted runtime BIOS. For example there may be a second replacement portion of the virtual trusted runtime BIOS. A second replacement portion may include a resource that was replaced by the replacement portion or may replace a resource of the virtual trusted runtime BIOS. A replacement portion of the virtual trusted runtime BIOS may also include multiple resources that are being replaced by the replacement portion.

In one implementation the BIOS 250 and the EFI 255 can include resources that are accessible by web based protocols using an address of the resource. For example the virtual trusted runtime BIOS 225 or the replacement portion of the virtual trusted runtime BIOS 226 may be able to control a portion of the hardware 205 of the system. To control the hardware a communication may be made to the BIOS 250 or EFI 255 by the virtual trusted runtime BIOS 225 or the replacement portion of the virtual trusted runtime BIOS 226.

In one implementation the hardware may include a transceiver 265. The transceiver can connected the computing system 200 to a network or to another computing system. Connecting the computing system 200 to a network with other computing system or directly to another computing system can allow the virtual trusted runtime BIOS 225 or a replacement portion of the virtual trusted runtime BIOS to reside in a location remote from the computing system. In one example, the virtual trusted runtime BIOS 225 resides in the computing system 200 at a first address and the replacement portion of the virtual trusted runtime BIOS resides at a second address remote from the computing system. If the guest domain 230 for example sends a request for a resource to the virtual trusted runtime BIOS then the router 290 would use the first address however if the replacement portion includes a replacement of the requested resource the address would be that of the resource at the replacement portion of the virtual trusted runtime BIOS which would be routed to the transceiver 265 which would get routed to the replacement portion of the virtual trusted runtime BIOS based on the second address regardless of where it is located.

Figure 3:
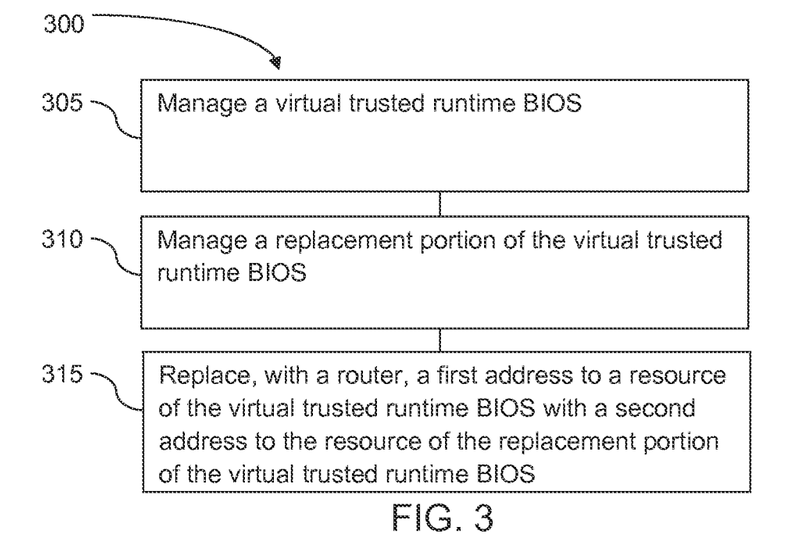
FIG. 3 is a flow diagram of a method of replacing a portion of a virtual trusted runtime BIOS according to an implementation.

FIG. 3 is a flow diagram of a method of replacing a portion of a virtual trusted runtime BIOS according to an implementation. The method of replacing a portion of a virtual trusted runtime BIOS in a computing system 100 begins by managing a virtual trusted runtime BIOS at 305. The managing of the virtual trusted runtime BIOS 125 can be by the virtual machine monitor 115.

The method can manage a replacement portion of the virtual trusted runtime BIOS at 310. The management of the replacement portion of the virtual trusted runtime BIOS may be by the VMM. The VMM may generate the replacement portion of the virtual trusted runtime BIOS, or may receive the replacement portion of the virtual trusted runtime BIOS from an external source, such as a manufacturer of the computing system. The management of the replacement portion on the virtual trusted runtime BIOS may include putting the replacement portion on the virtual trusted runtime BIOS in the domain hosting the virtual trusted runtime BIOS or in another domain which may include a domain remote from the computing system.

A router 190 can replace a first address to a resource of the virtual trusted runtime BIOS with a second address to the resource of the replacement portion of the virtual trusted runtime BIOS at 315. The router may be for example a physical controller such as a processor 110, a virtual component such as a VMM or another component.

Figure 4:
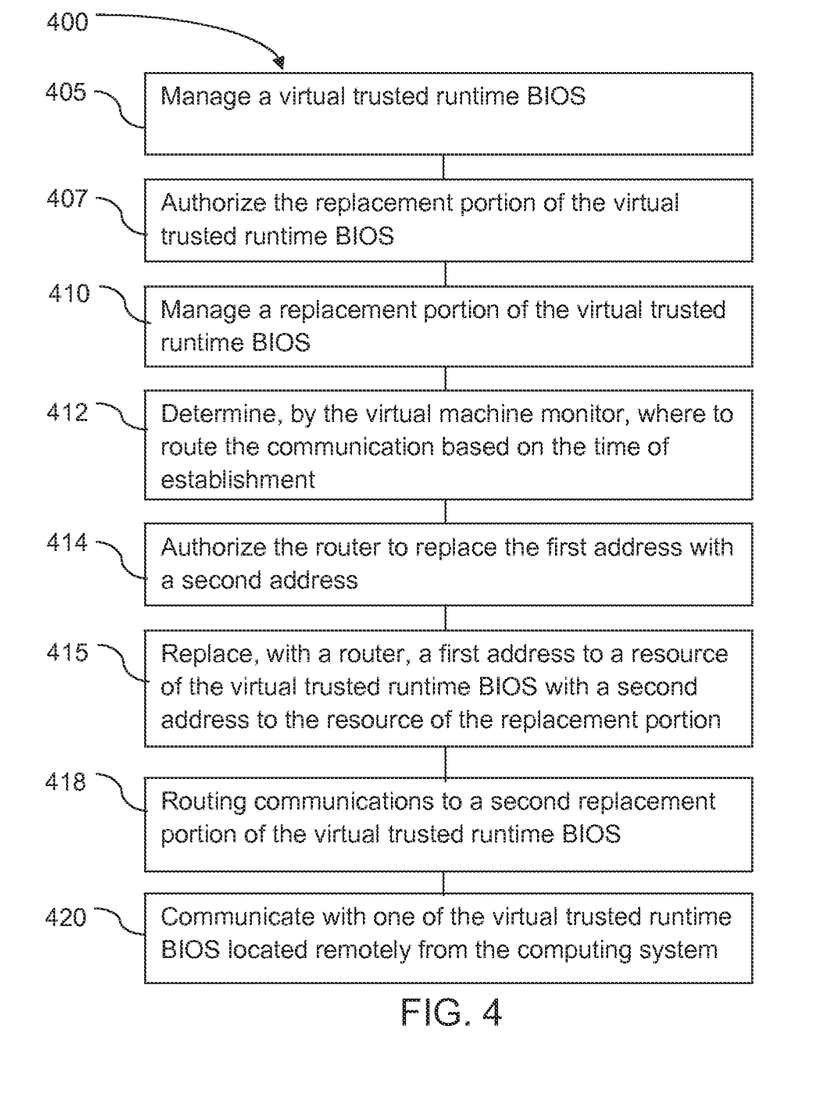
FIG. 4 is a flow diagram of a method of replacing a portion of a virtual trusted runtime BIOS according to an implementation.

FIG. 4 is a flow diagram of a method of replacing a portion of a virtual trusted runtime BIOS according to an implementation. The method of replacing a portion of a virtual trusted runtime BIOS in a computing system 100 begins by managing a virtual trusted runtime BIOS at 405. The managing of the virtual trusted runtime BIOS 125 can be by the virtual machine monitor 115.

The replacement portion of the virtual trusted runtime BIOS may be authorized at 407. The authorization of the replacement portion of the virtual trusted runtime BIOS may be by an authorization module or may be by the VMM in the same way that the virtual trusted runtime BIOS is trusted. The authorization may review a digital signature, digital certificate or another type of secure authorization.

The method can manage a replacement portion of the virtual trusted runtime BIOS at 410. The management of the replacement portion of the virtual trusted runtime BIOS may be by the VMM. The VMM may generate the replacement portion of the virtual trusted runtime BIOS, or may receive the replacement portion of the virtual trusted runtime BIOS from an external source, such as a manufacturer of the computing system. The management of the replacement portion on the virtual trusted runtime BIOS may include putting the replacement portion on the virtual trusted runtime BIOS in the domain hosting the virtual trusted runtime BIOS or in another domain which may include a domain remote from the computing system.

Replacement of the first address to a resource of the virtual trusted runtime BIOS with a second address to the resource of the replacement portion of the virtual trusted runtime BIOS by the router may be authorized at 414. The authorization of the replacement of the first address with the second address may be by an authorization module or may be by the VMM in the same way that the virtual trusted runtime BIOS is trusted. The authorization may review a digital signature, digital certificate or another type of secure authorization.

A router can replace a first address to a resource of the virtual trusted runtime BIOS with a second address to the resource of the replacement portion of the virtual trusted runtime BIOS at 415. The router may be for example a physical controller such as a processor 110, a virtual component such as a VMM or another component.

A second replacement portion of the virtual trusted runtime BIOS may be managed by the VMM. Communications may be routed to a second replacement portion of the virtual trusted runtime BIOS at 418.

In one implementation, either or both of the virtual trusted runtime BIOS and the replacement portion of the virtual trusted runtime BIOS may be located remotely and communicated with at 420. The communication may be by directing the communication to an address of a requested resource. The address of the communication may be an address used in a web communication protocol to route the communication to the address.

The requested resource may be provided by both virtual trusted runtime BIOS and the replacement portion of the virtual trusted runtime BIOS. To determine whether to replace the address of the communication the time that the virtual trusted runtime BIOS and the replacement portion of the virtual trusted runtime BIOS are established may be considered at 412. For example if the time that the replacement portion of the virtual trusted runtime BIOS is established is chronologically after the time that the virtual trusted runtime BIOS is established then the address of the more recent resource of the replacement portion of the virtual trusted runtime BIOS may be used to route the communication to the requested resource.

Figure 5:
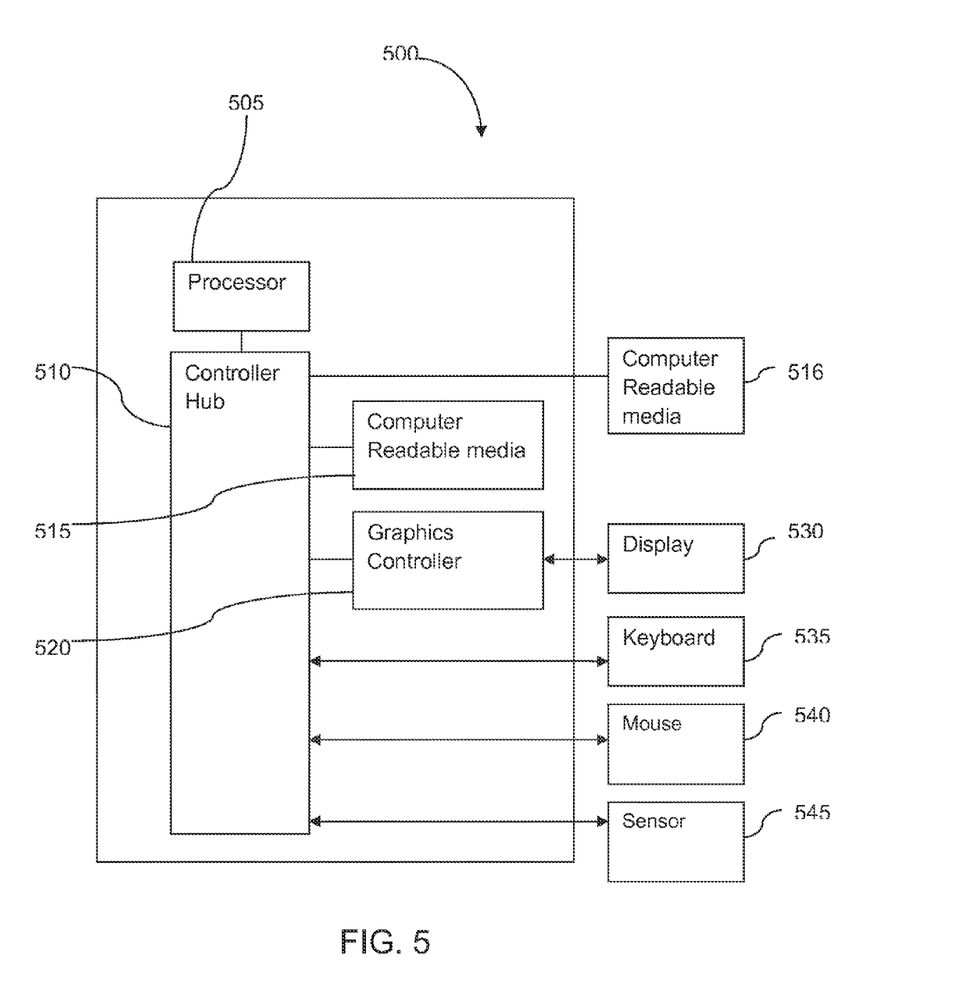
FIG. 5 is a block diagram of a computing system according to an example implementation of a computer readable medium.

FIG. 5 is a block diagram of a computing system 500 according to an example implementation of a computer readable media 515-516. The computing system may include a controller hub 510 that may connect to a graphics controller 520, a display 530, a keyboard 535, mouse 540, and sensor 545. The computer readable media 515-516 can include code that if executed by a processor 505 can manage a virtual trusted runtime BIOS and manage a replacement portion of the virtual trusted runtime BIOS. The code can also replace a first address to a resource of the virtual trusted runtime BIOS with a second address to the resource of the replacement portion of the virtual trusted runtime BIOS.

Various modules, such as those depicted in other figures, can be implemented as machine-readable instructions that can be executed on one or multiple processors. A processor can include a microprocessor, microcontroller, processor module or subsystem, programmable integrated circuit, programmable gate array, or another control or computing device.

The machine-readable instructions can be stored in machine-readable or computer-readable storage media, which can be implemented as one or multiple computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computing system comprising:
    hardware;
    a virtual machine monitor;
    a virtual trusted runtime BIOS managed by the virtual machine monitor;
    a replacement portion of the virtual trusted runtime BIOS, the replacement portion including a replacement resource for a first resource of the virtual trusted runtime BIOS; and
    a router,
    wherein the virtual machine monitor is to receive an access request including a first address to the first resource of the virtual trusted runtime BIOS, and to determine whether to redirect the access request to the replacement portion,
    wherein the router is to, in response to a determination to redirect the access request to the replacement portion, replace, in the access request, the first address to the first resource of the virtual trusted runtime BIOS with a second address to the replacement resource of the replacement portion.

2. The system of claim 1, further comprising a second replacement portion of the virtual trusted runtime BIOS.

3. The system of claim 1, further comprising an authorization module to authorize the replacement of the first address to the first resource of the virtual trusted runtime BIOS with the second address to the replacement resource of the replacement portion.

4. The system of claim 3, wherein the authorization module authorizes the replacement of the first address after authenticating a digital signature of the replacement portion.

5. The system of claim 1, further comprising a privileged domain to host the virtual trusted runtime BIOS and the replacement portion of the virtual trusted runtime BIOS.

6. The system of claim 1, further comprising a transceiver to communicate with the virtual trusted runtime BIOS or the replacement portion of the virtual trusted runtime BIOS.

7. A method comprising:
    managing a virtual trusted runtime BIOS;

managing a replacement portion of the virtual trusted runtime BIOS, the replacement portion including a replacement resource for a first resource of the virtual trusted runtime BIOS;

receiving an access request for the first resource of the virtual trusted runtime BIOS, the access request including a first address to the first resource;

determining, by a virtual machine monitor, whether to redirect the access request to the replacement portion; and in response to a determination to redirect the access request to the replacement portion, replacing in the access request, with a router, the first address to the first resource of the virtual trusted runtime BIOS with a second address to the replacement resource of the replacement portion.

8. The method of claim 7, further comprising authorizing the replacement portion of the virtual trusted runtime BIOS.

9. The method of claim 8, further comprising authorizing the router to replace the first address to the first resource of the virtual trusted runtime BIOS with the second address to the replacement resource of the replacement portion.

10. The method of claim 7, further comprising communicating with the virtual trusted runtime BIOS or the replacement portion of the virtual trusted runtime BIOS.

11. The method of claim 7, further comprising determining, by the virtual machine monitor, whether to redirect the access request to the replacement portion based on the times that the virtual trusted runtime BIOS and the replacement portion of the virtual trusted runtime BIOS were established.

12. A computer readable medium comprising code that when executed by a processor causes a computing device to:

manage a virtual trusted runtime BIOS;

manage a replacement portion of the virtual trusted runtime BIOS, the replacement portion including a replacement resource for a first resource of the virtual trusted runtime BIOS;

receive an access request for the first resource of the virtual trusted runtime BIOS, the access request including a first address to the first resource;

determine, by a virtual machine monitor, whether to redirect the access request to the replacement portion; and in response to a determination to redirect the access request to the replacement portion, replace, in the access request, using a router, the first address to the first resource of the virtual trusted runtime BIOS with a second address to the replacement resource of the replacement portion of the virtual trusted runtime BIOS, wherein the computer readable medium is non-transitory.

13. The computer readable medium of claim 12 further comprising code that when executed causes the computing device to:

communicate with the virtual runtime BIOS or the replacement portion of the virtual trusted runtime BIOS.

14. The computer readable medium of claim 12 further comprising code that when executed causes the computing device to:

communicate with the virtual trusted runtime BIOS or the replacement portion of the virtual trusted runtime BIOS using a web communication protocol.

15. The computer readable medium of claim 12 further comprising code that when executed causes the computing device to:

authorize the router to replace the first address to the first resource of the virtual trusted runtime BIOS with the second address to the replacement resource of the replacement portion.

16. The computer readable medium of claim 12, wherein the determination to redirect the access request to the replacement portion is based on the times that the virtual trusted runtime BIOS and the replacement portion of the virtual trusted runtime BIOS were established.

17. The computer readable medium of claim 12, wherein the virtual trusted runtime BIOS and the replacement portion are hosted in a privileged domain, and wherein the access request for the first resource is received from a guest domain.

18. The system of claim 1, wherein the virtual machine monitor is to determine whether to redirect the access request to the replacement portion based on the times that the virtual trusted runtime BIOS and the replacement portion of the virtual trusted runtime BIOS were established.

19. The system of claim 5, wherein the access request for the first resource is received from a guest domain.

20. The method of claim 7, wherein the virtual trusted runtime BIOS and the replacement portion are hosted in a privileged domain, and wherein the access request for the first resource is received from a guest domain.

* * * * *

UNITED STATES PATENT AND TRADEMARK OFFICE
CERTIFICATE OF CORRECTION

| | |
|---|---|
| PATENT NO. | : 9,542,197 B2 |
| APPLICATION NO. | : 14/347086 |
| DATED | : January 10, 2017 |
| INVENTOR(S) | : Valiuddin Y. Ali et al. |

It is certified that error appears in the above-identified patent and that said Letters Patent is hereby corrected as shown below:

On the Title Page

In item (75), Inventors, in Column 1, Line 4, delete "Lyons" and insert -- Lyon --, therefor.

Signed and Sealed this
Eighteenth Day of April, 2017

Michelle K. Lee
*Director of the United States Patent and Trademark Office*